US009674892B1

(12) United States Patent
Li et al.

(10) Patent No.: US 9,674,892 B1
(45) Date of Patent: Jun. 6, 2017

(54) EXCLUSIVE PRESHARED KEY AUTHENTICATION

(75) Inventors: Mingliang Li, Sunnyvale, CA (US); Changming Liu, Cupertino, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 509 days.

(21) Appl. No.: 12/485,041

(22) Filed: Jun. 16, 2009

Related U.S. Application Data

(60) Provisional application No. 61/111,210, filed on Nov. 4, 2008.

(51) Int. Cl.
*H04L 9/32* (2006.01)
*H04W 88/08* (2009.01)
*H04W 12/04* (2009.01)

(52) U.S. Cl.
CPC ........... *H04W 88/08* (2013.01); *H04W 12/04* (2013.01)

(58) Field of Classification Search
CPC .............................. H04W 88/08; H04W 12/04
USPC ........................................................ 713/176
See application file for complete search history.

(56) References Cited

U.S. PATENT DOCUMENTS

| 5,471,671 | A | 11/1995 | Wang et al. |
| 5,697,059 | A | 12/1997 | Carney |
| 5,726,984 | A | 3/1998 | Kubler et al. |
| 5,956,643 | A | 9/1999 | Benveniste |
| 6,061,799 | A | * | 5/2000 | Eldridge et al. ............... 726/20 |
| 6,112,092 | A | 8/2000 | Benveniste |
| 6,154,655 | A | 11/2000 | Borst et al. |
| 6,201,792 | B1 | 3/2001 | Lahat |

(Continued)

FOREIGN PATENT DOCUMENTS

| EP | 0940999 | 9/1999 |
| EP | 1732276 | 12/2006 |

(Continued)

OTHER PUBLICATIONS

Chenghua et al., "Analysis of the 802.11i 4-Way Handshake," 2004.*

(Continued)

*Primary Examiner* — Andrew Georgandellis
(74) *Attorney, Agent, or Firm* — Sheppard, Mullin, Richter & Hampton LLP

(57) ABSTRACT

Preshared keys are assigned to client devices, users, or user groups. The set of valid preshared keys or keys derived therefrom is distributed to network devices such as wireless access points. A client device attempts to establish a secure network connection with a network device using its assigned preshared key. A network device identifies the client device's preshared key by selecting a candidate key from its set of valid preshared keys. The network device determines a validation cryptographic checksum based on the selected candidate key. If the validation cryptographic checksum matches the client's cryptographic checksum, the network device establishes a secure network connection with the client device using this candidate key. If the validation cryptographic checksum does not match the cryptographic checksum provided by the client device, the network device repeats this comparison using different candidate keys selected from its set of valid preshared keys until a match is found.

21 Claims, 6 Drawing Sheets

(56) References Cited

U.S. PATENT DOCUMENTS

| | | |
|---|---|---|
| 6,314,294 B1 | 11/2001 | Benveniste |
| 6,473,413 B1 | 10/2002 | Chiou et al. |
| 6,496,699 B2 | 12/2002 | Benveniste |
| 6,519,461 B1 | 2/2003 | Andersson et al. |
| 6,628,623 B1 | 9/2003 | Noy |
| 6,628,938 B1 | 9/2003 | Rachabathuni et al. |
| 6,775,549 B2 | 8/2004 | Benveniste |
| 6,865,393 B1 | 3/2005 | Baum et al. |
| 7,002,943 B2 | 2/2006 | Bhagwat et al. |
| 7,057,566 B2 | 6/2006 | Theobold |
| 7,085,224 B1 | 8/2006 | Oran |
| 7,085,241 B1 | 8/2006 | O'Neill et al. |
| 7,154,874 B2 | 12/2006 | Bhagwat et al. |
| 7,164,667 B2 | 1/2007 | Rayment et al. |
| 7,174,170 B2 | 2/2007 | Steer et al. |
| 7,177,646 B2 | 2/2007 | Corson et al. |
| 7,181,530 B1 | 2/2007 | Halasz et al. |
| 7,216,365 B2 | 5/2007 | Bhagwat et al. |
| 7,224,697 B2 | 5/2007 | Banerjea et al. |
| 7,251,238 B2 | 7/2007 | Joshi et al. |
| 7,336,670 B1 | 2/2008 | Calhoun |
| 7,339,914 B2 | 3/2008 | Bhagwat et al. |
| 7,346,338 B1 | 3/2008 | Calhoun et al. |
| 7,366,894 B1 | 4/2008 | Kalimuthu et al. |
| 7,370,362 B2 | 5/2008 | Olson et al. |
| 7,440,434 B2 | 10/2008 | Chaskar et al. |
| 7,512,379 B2 | 3/2009 | Nguyen |
| 7,536,723 B1 | 5/2009 | Bhagwat et al. |
| 7,562,384 B1 * | 7/2009 | Huang .................. H04L 63/164 713/170 |
| 7,593,356 B1 | 9/2009 | Friday et al. |
| 7,656,822 B1 | 2/2010 | AbdelAziz et al. |
| 7,706,789 B2 | 4/2010 | Qi et al. |
| 7,716,370 B1 | 5/2010 | Devarapalli |
| 7,751,393 B2 | 7/2010 | Chaskar et al. |
| 7,768,952 B2 * | 8/2010 | Lee ............................ 370/310.2 |
| 7,793,104 B2 * | 9/2010 | Zheng et al. ................. 713/171 |
| 7,804,808 B2 | 9/2010 | Bhagwat et al. |
| 7,843,907 B1 | 11/2010 | Abou-Emara et al. |
| 7,844,057 B2 | 11/2010 | Meier et al. |
| 7,856,209 B1 | 12/2010 | Rawat |
| 7,921,185 B2 | 4/2011 | Chawla et al. |
| 7,949,342 B2 | 5/2011 | Cuffaro et al. |
| 7,961,725 B2 | 6/2011 | Nagarajan et al. |
| 7,970,894 B1 | 6/2011 | Patwardhan |
| 8,000,308 B2 | 8/2011 | Dietrich et al. |
| 8,219,688 B2 | 7/2012 | Wang |
| 8,249,606 B1 | 8/2012 | Neophytou et al. |
| 8,493,918 B2 | 7/2013 | Karaoguz et al. |
| 8,789,191 B2 | 7/2014 | Bhagwat et al. |
| 8,824,448 B1 | 9/2014 | Narayana et al. |
| 8,948,046 B2 | 2/2015 | Kang et al. |
| 9,003,527 B2 | 4/2015 | Bhagwat et al. |
| 2001/0006508 A1 | 7/2001 | Pankaj et al. |
| 2002/0012320 A1 | 1/2002 | Ogier et al. |
| 2002/0021689 A1 | 2/2002 | Robbins et al. |
| 2002/0071422 A1 | 6/2002 | Amicangioli |
| 2002/0091813 A1 | 7/2002 | Lamberton et al. |
| 2002/0116463 A1 | 8/2002 | Hart |
| 2002/0128984 A1 | 9/2002 | Mehta et al. |
| 2003/0005100 A1 | 1/2003 | Barnard et al. |
| 2003/0039212 A1 | 2/2003 | Lloyd et al. |
| 2003/0087629 A1 | 5/2003 | Juitt |
| 2003/0104814 A1 | 6/2003 | Gwon et al. |
| 2003/0129988 A1 | 7/2003 | Lee et al. |
| 2003/0145091 A1 | 7/2003 | Peng et al. |
| 2003/0179742 A1 | 9/2003 | Ogier et al. |
| 2004/0003285 A1 | 1/2004 | Whelan et al. |
| 2004/0013118 A1 | 1/2004 | Borella |
| 2004/0022222 A1 | 2/2004 | Clisham |
| 2004/0054774 A1 | 3/2004 | Barber et al. |
| 2004/0064467 A1 | 4/2004 | Kola et al. |
| 2004/0077341 A1 | 4/2004 | Chandranmenon et al. |
| 2004/0103282 A1 | 5/2004 | Meier et al. |
| 2004/0109466 A1 | 6/2004 | Van Ackere et al. |
| 2004/0162037 A1 | 8/2004 | Shpak |
| 2004/0185876 A1 | 9/2004 | Groenendaal et al. |
| 2004/0192312 A1 | 9/2004 | Li et al. |
| 2004/0196977 A1 * | 10/2004 | Johnson et al. ............... 380/270 |
| 2004/0236939 A1 * | 11/2004 | Watanabe et al. ............ 713/150 |
| 2004/0255028 A1 | 12/2004 | Chu et al. |
| 2005/0053003 A1 | 3/2005 | Cain et al. |
| 2005/0074015 A1 | 4/2005 | Chari et al. |
| 2005/0099983 A1 | 5/2005 | Nakamura et al. |
| 2005/0122946 A1 | 6/2005 | Won |
| 2005/0154774 A1 | 7/2005 | Giaffreda et al. |
| 2005/0207417 A1 | 9/2005 | Ogawa et al. |
| 2005/0259682 A1 | 11/2005 | Yosef et al. |
| 2005/0262266 A1 | 11/2005 | Wiberg et al. |
| 2005/0265288 A1 | 12/2005 | Liu et al. |
| 2005/0266848 A1 | 12/2005 | Kim |
| 2006/0013179 A1 | 1/2006 | Yamane |
| 2006/0026289 A1 | 2/2006 | Lyndersay et al. |
| 2006/0062250 A1 | 3/2006 | Payne, III |
| 2006/0107050 A1 * | 5/2006 | Shih ............................ 713/171 |
| 2006/0117018 A1 | 6/2006 | Christiansen et al. |
| 2006/0140123 A1 | 6/2006 | Conner et al. |
| 2006/0146748 A1 | 7/2006 | Ng et al. |
| 2006/0146846 A1 | 7/2006 | Yarvis et al. |
| 2006/0165015 A1 | 7/2006 | Melick et al. |
| 2006/0187949 A1 | 8/2006 | Seshan et al. |
| 2006/0221920 A1 | 10/2006 | Gopalakrishnan et al. |
| 2006/0233128 A1 | 10/2006 | Sood et al. |
| 2006/0234701 A1 | 10/2006 | Wang et al. |
| 2006/0245442 A1 | 11/2006 | Srikrishna et al. |
| 2006/0251256 A1 * | 11/2006 | Asokan .................. H04L 63/065 380/270 |
| 2006/0268802 A1 | 11/2006 | Faccin |
| 2006/0294246 A1 | 12/2006 | Stieglitz et al. |
| 2007/0004394 A1 | 1/2007 | Chu et al. |
| 2007/0010231 A1 * | 1/2007 | Du ............................ 455/405 |
| 2007/0025274 A1 | 2/2007 | Rahman et al. |
| 2007/0025298 A1 | 2/2007 | Jung |
| 2007/0077937 A1 | 4/2007 | Ramakrishnan et al. |
| 2007/0078663 A1 | 4/2007 | Grace |
| 2007/0082656 A1 | 4/2007 | Stieglitz et al. |
| 2007/0087756 A1 | 4/2007 | Hoffberg |
| 2007/0091859 A1 | 4/2007 | Sethi et al. |
| 2007/0115847 A1 | 5/2007 | Strutt et al. |
| 2007/0116011 A1 | 5/2007 | Lim et al. |
| 2007/0121947 A1 * | 5/2007 | Sood et al. ................... 380/277 |
| 2007/0133407 A1 | 6/2007 | Choi et al. |
| 2007/0140191 A1 | 6/2007 | Kojima |
| 2007/0150720 A1 * | 6/2007 | Oh ......................... H04L 63/065 713/153 |
| 2007/0153741 A1 | 7/2007 | Blanchette et al. |
| 2007/0156804 A1 | 7/2007 | Mo |
| 2007/0160017 A1 | 7/2007 | Meier et al. |
| 2007/0171885 A1 | 7/2007 | Bhagwat et al. |
| 2007/0192862 A1 | 8/2007 | Vermeulen et al. |
| 2007/0195761 A1 | 8/2007 | Tatar et al. |
| 2007/0249324 A1 * | 10/2007 | Jou et al. ...................... 455/411 |
| 2007/0263532 A1 | 11/2007 | Mirtorabi et al. |
| 2007/0280481 A1 * | 12/2007 | Eastlake et al. .............. 380/277 |
| 2007/0288997 A1 | 12/2007 | Meier et al. |
| 2008/0002642 A1 | 1/2008 | Borkar et al. |
| 2008/0022392 A1 * | 1/2008 | Karpati .................... H04L 63/20 726/15 |
| 2008/0037552 A1 | 2/2008 | Dos Remedios et al. |
| 2008/0080369 A1 | 4/2008 | Sumioka |
| 2008/0080377 A1 | 4/2008 | Sasaki et al. |
| 2008/0090575 A1 | 4/2008 | Barak et al. |
| 2008/0095094 A1 | 4/2008 | Innami |
| 2008/0095163 A1 | 4/2008 | Chen et al. |
| 2008/0107027 A1 | 5/2008 | Allan et al. |
| 2008/0109879 A1 | 5/2008 | Bhagwat et al. |
| 2008/0130495 A1 | 6/2008 | Dos Remedios et al. |
| 2008/0146240 A1 | 6/2008 | Trudeau |
| 2008/0170527 A1 | 7/2008 | Lundsgaard et al. |
| 2008/0207215 A1 | 8/2008 | Chu et al. |
| 2008/0212562 A1 | 9/2008 | Bedekar et al. |
| 2008/0219286 A1 | 9/2008 | Ji et al. |
| 2008/0225857 A1 | 9/2008 | Lange |
| 2008/0229095 A1 | 9/2008 | Kalimuthu et al. |

(56) References Cited

U.S. PATENT DOCUMENTS

| | | |
|---|---|---|
| 2008/0240128 A1 | 10/2008 | Elrod |
| 2008/0253370 A1 | 10/2008 | Cremin et al. |
| 2008/0273520 A1 | 11/2008 | Kim et al. |
| 2008/0279161 A1 | 11/2008 | Stirbu et al. |
| 2009/0019521 A1 | 1/2009 | Vasudevan |
| 2009/0028052 A1 | 1/2009 | Strater et al. |
| 2009/0040989 A1 | 2/2009 | da Costa et al. |
| 2009/0043901 A1 | 2/2009 | Mizikovsky et al. |
| 2009/0082025 A1 | 3/2009 | Song |
| 2009/0088152 A1 | 4/2009 | Orlassino |
| 2009/0097436 A1 | 4/2009 | Vasudevan et al. |
| 2009/0111468 A1 | 4/2009 | Burgess et al. |
| 2009/0113018 A1 | 4/2009 | Thomson et al. |
| 2009/0141692 A1 | 6/2009 | Kasslin et al. |
| 2009/0144740 A1 | 6/2009 | Gao |
| 2009/0168645 A1 | 7/2009 | Tester et al. |
| 2009/0172151 A1 | 7/2009 | Davis |
| 2009/0197597 A1 | 8/2009 | Kotecha |
| 2009/0239531 A1 | 9/2009 | Andreasen et al. |
| 2009/0240789 A1 | 9/2009 | Dandabany |
| 2009/0247170 A1 | 10/2009 | Balasubramanian et al. |
| 2009/0310557 A1 | 12/2009 | Shinozaki |
| 2010/0046368 A1 | 2/2010 | Kaempfer et al. |
| 2010/0057930 A1 | 3/2010 | DeHaan |
| 2010/0067379 A1 | 3/2010 | Zhao et al. |
| 2010/0112540 A1 | 5/2010 | Gross et al. |
| 2010/0115278 A1* | 5/2010 | Shen ............... H04L 9/0844 713/171 |
| 2010/0115576 A1* | 5/2010 | Hale et al. ............... 725/152 |
| 2010/0132040 A1 | 5/2010 | Bhagwat et al. |
| 2010/0208614 A1 | 8/2010 | Harmatos |
| 2010/0228843 A1 | 9/2010 | Ok et al. |
| 2010/0240313 A1 | 9/2010 | Kawai |
| 2010/0254316 A1 | 10/2010 | Sendrowicz |
| 2010/0260091 A1 | 10/2010 | Seok |
| 2010/0290397 A1 | 11/2010 | Narayana et al. |
| 2010/0304738 A1 | 12/2010 | Lim et al. |
| 2010/0311420 A1 | 12/2010 | Reza et al. |
| 2010/0322217 A1 | 12/2010 | Jin et al. |
| 2010/0325720 A1 | 12/2010 | Etchegoyen |
| 2011/0004913 A1 | 1/2011 | Nagarajan et al. |
| 2011/0040867 A1 | 2/2011 | Kalbag |
| 2011/0051677 A1 | 3/2011 | Jetcheva et al. |
| 2011/0055326 A1 | 3/2011 | Michaelis et al. |
| 2011/0055928 A1 | 3/2011 | Brindza |
| 2011/0058524 A1 | 3/2011 | Hart et al. |
| 2011/0064065 A1 | 3/2011 | Nakajima et al. |
| 2011/0085464 A1 | 4/2011 | Nordmark et al. |
| 2011/0182225 A1 | 7/2011 | Song et al. |
| 2011/0185231 A1 | 7/2011 | Balestrieri et al. |
| 2011/0258641 A1 | 10/2011 | Armstrong et al. |
| 2011/0292897 A1 | 12/2011 | Wu et al. |
| 2012/0014386 A1 | 1/2012 | Xiong et al. |
| 2012/0290650 A1 | 11/2012 | Montuno et al. |
| 2013/0003729 A1 | 1/2013 | Raman et al. |
| 2013/0003739 A1 | 1/2013 | Raman et al. |
| 2013/0028158 A1 | 1/2013 | Lee et al. |
| 2013/0059570 A1 | 3/2013 | Hara et al. |
| 2013/0086403 A1 | 4/2013 | Jenne et al. |
| 2013/0103833 A1 | 4/2013 | Ringland et al. |
| 2013/0230020 A1 | 9/2013 | Backes |
| 2013/0250811 A1 | 9/2013 | Vasseur et al. |
| 2014/0269327 A1 | 9/2014 | Fulknier et al. |
| 2014/0298467 A1 | 10/2014 | Bhagwat et al. |
| 2015/0120864 A1 | 4/2015 | Unnimadhavan et al. |

FOREIGN PATENT DOCUMENTS

| | | |
|---|---|---|
| EP | 1771026 | 4/2007 |
| EP | 1490773 | 1/2013 |
| WO | 0059251 | 10/2000 |
| WO | 2004042971 | 5/2004 |
| WO | WO 2006129287 A1 * | 12/2006 |
| WO | 2009141016 | 11/2009 |

OTHER PUBLICATIONS

Clausen, T., et al., Optimized Link State Routing Protocol (OLSR), Network Working Group, Oct. 2003, pp. 1-71.

Perkins, C., et al., Ad hoc On-Demand Distance Vector (AODV) Routing, Network Working Group, Oct. 2003, pp. 1-35.

International Application No. PCT/US2011/047591, International Search Report and Written Opinion mailed Dec. 19, 2011.

International Application No. PCT/US2008/061674, International Search Report and Written Opinion mailed Oct. 14, 2008.

International Application No. PCT/US2012/059093, International Search Report and Written Opinion mailed Jan. 4, 2013.

Lee, Jae Woo et al, "z2z: Discovering Zeroconf Services Beyond Local Link," 2007 IEEE Globecom Workshops, pp. 1-7, Nov. 26, 2007.

Wu, Haitao et al., "Layer 2.5 SoftMAC: End-System Based Media Streaming Support on Home Networks," IEEE Global Telecommunications Conference (GLOBECOM '05), vol. 1, pp. 235-239, Nov. 2005.

European Patent Application No. 12879114.2, Search Report mailed Jan. 21, 2016.

Chirumamilla, Mohan K. et al., "Agent Based Intrusion Detection and Response System for Wireless LANs," CSE Conference and Workshop Papers, Paper 64, Jan. 1, 2003.

Craiger, J. Philip, "802.11, 802.1x, and Wireless Security," SANS Institute InfoSec Reading Room, Jun. 23, 2002.

Finlayson, Ross et al., "A Reverse Address Resolution Protocol," Nework Working Group, Request for Comments: 903 (RFC 903), Jun. 1984.

European Patent Application No. 11823931.8, Search Report mailed Aug. 29, 2016.

* cited by examiner

EXCLUSIVE PRESHARED KEY AUTHENTICATION

CROSS-REFERENCE TO RELATED APPLICATIONS

This application claims priority to U.S. Provisional Patent Application No. 61/111,210, filed Nov. 4, 2008, which is incorporated by reference herein for all purposes.

BACKGROUND OF THE INVENTION

The present invention relates to the field of communication networks, and in particular to the systems and methods for authenticating users and devices for access to communication networks. Communications networks allow computers and other electronic devices to exchange data. Wireless networks, which exchange data without wires, typically using radio waves, are popular with users due to the ability to send and receive data almost anywhere within the physical coverage area of the network. This allows users to access communication networks, including local area networks, organization or company intranets, virtual private networks, and wide area networks, such as the Internet, anywhere within the physical coverage area of the wireless networks.

Wireless networks with large physical coverage areas, such as networks covering university campuses or entire cities, offer users ubiquitous access to their data and the Internet. However, typical wireless access points have a ranges of around 100 feet. As a result, large wireless networks require tens, hundreds, or thousands of wireless access points to provide network coverage over a large physical area.

Configuring, managing, and operating a large number of wireless access points requires complicated network configurations. One complication with managing wireless access points is managing network security. Network security typically includes authentication to prevent unauthorized users or devices from accessing the network and data encryption to prevent eavesdropping on communications of authorized users or devices.

There are many wired and wireless networking standards, including the 802.11 set of IEEE standards, that govern wireless networking communications and security methods. In general, the most secure types of wireless networking security, such as the 802.1X standard, often rely on authentication servers and cryptographic certificates to authenticate users and devices and exchange encryption keys to establish secure network connections. However, configuring and maintaining authentication servers and certificates is complicated, error-prone, and expensive. Additionally, users often find it difficult to install the required certificates and configure their devices to use these authentication schemes. This makes it difficult to deploy this type of network security, especially in situations where users and devices are frequently added and removed, such as hotels, conference centers, and other locations that wish to provide wireless networking to visitors.

Another network security approach relies on a preshared key (PSK) to authenticate users and establish secure communications. In these approaches, users are provided with a password or other login information in advance of connecting with the network. This approach is relatively easy for users and network administrators to implement. Authentication servers and certificates are not required. Users can typically configure their devices to connect with the network by inputting the provided password or other login information.

However, preshared key approaches are much less secure than other authentication techniques. Typically, a single preshared key is used by every user and device connecting with the network. This allows any user or device to eavesdrop on the communications of any other device connected via the network. Additionally, anyone with knowledge of the preshared key can access the network. This can be a disadvantage when an employee leaves a company, but can still access the company network using the preshared key. To prevent this, network administrators can change the preshared key. However, this requires all of the legitimate network users and devices to update their configurations, which can be very disruptive.

SUMMARY

An embodiment of the invention provides much of the same control and flexibility as that provided by authentication server-based network security techniques with the administrative and technical simplicity of preshared key-based network security. In an embodiment, preshared keys are assigned exclusively to specific client devices, users, or user groups. The set of valid preshared keys or keys derived from the preshared keys is distributed to network devices such as wireless access points.

Upon connecting with a network device, a client device attempts to establish a secure network connection using its assigned preshared key. In an embodiment, a network device attempts to identify the preshared key used by the client device. If this identification is successful, the network device establishes a secure network connection with the client device.

In an embodiment, a network device attempts to identify the preshared key used by the client device by selecting one of its set of valid preshared keys as a candidate key. The network device then determines a validation cryptographic checksum based on the selected candidate key. If the validation cryptographic checksum matches a cryptographic checksum provided by the client device using its assigned preshared key, then the selected candidate key is the preshared key assigned to the client device. If the validation cryptographic checksum does not match the cryptographic checksum provided by the client device, then the network device repeats this comparison using a different candidate key selected from its set of valid preshared keys. This comparison may be repeated using each of the valid preshared keys to determine a validation cryptographic checksum until the preshared key of the client device is identified or the set of valid preshared keys is exhausted.

Once the preshared key used by the client device is identified, an embodiment of the invention may optionally perform a user authentication using an authentication server. Alternatively, a secure network connection may be established without the use of an authentication server.

BRIEF DESCRIPTION OF THE DRAWINGS

The invention will be described with reference to the drawings, in which.

DETAILED DESCRIPTION

An embodiment of the invention allows for users or devices to access a communications network using different preshared keys. An embodiment of the invention automatically manages the distribution and revocation of multiple preshared keys to any number of network devices, ensuring that each user or device can connect using their assigned preshared key. An embodiment of the invention also includes a modified authentication and handshake technique for network devices, such as wireless access points, to identify and authenticate the different preshared keys provided by client devices. For client devices, this authentication and handshake technique does not require any modification from standard preshared key network security techniques. Embodiments of the invention can be used with standard network drivers and applications on client devices and does not require the execution of any additional software applications or non-standard network configurations on client devices. This enables the modified authentication and handshake technique to be utilized with a wide range of client devices.

Additionally, embodiments of the invention may be implemented without an authentication server, such as a RADIUS server, reducing the cost and complexity of implementation. Other embodiments may use authentication servers for aspects of authentication and/or accounting for access charges. Even with authentication servers, client configuration is reduced in complexity.

Figure 1:
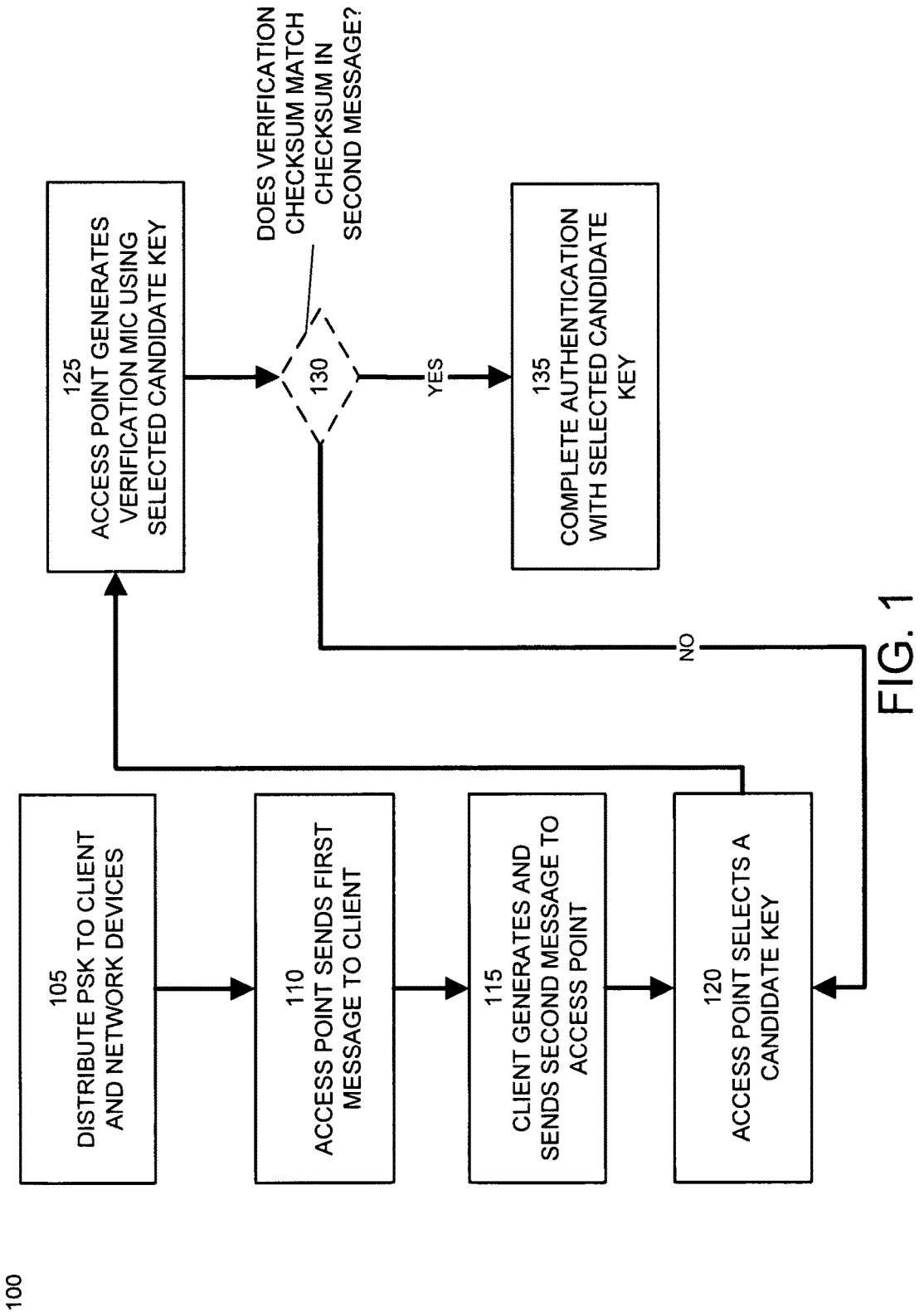
FIG. 1 illustrates a method of authenticating users and exchanging cryptographic keys according to an embodiment of the invention.

FIG. 1 illustrates a method 100 of authenticating users and exchanging cryptographic keys according to an embodiment of the invention. An embodiment of the invention uses a 4-way handshake to authenticate users and devices, collectively referred to as clients, and to exchange cryptographic keys, allowing clients to communicate securely with a communications network. In an embodiment of method 100, step 105 provides a client with a preshared key (PSK) or other shared secret prior to attempting to connect with the network. This preshared key is referred to as an exclusive preshared key, because it is assigned to a single user or group of users, rather than every user on a network. As described in detail below, step 105 also provides the preshared key to the network, including one or more wireless access points or other wireless network interface devices. Using the PSK, both the client and one or more network devices, such as wireless access points, separately derive a pairwise master key (PMK) from the PSK, for example as defined by the IEEE 802.11 family of network standards.

Upon a client connecting or associating with one of the wireless access points or other network devices of the network, in step 110 the wireless access point begins the 4-way handshake by sending a first message to the client. The first message includes a first cryptographic nonce, or number used once, to the client. This is referred to as the A-Nonce.

Upon receiving the A-Nonce, in an embodiment of step 115, the client generates and sends a second message in response to the first message. In an embodiment of method 100, the client generates its own nonce, referred to as the S-Nonce. Using the S-Nonce and the A-Nonce, the client generates a copy of a pairwise transient key (PTK), which will be used to encrypt future communications with the network. In an embodiment, the pairwise transient key is determined using a hash of the A-Nonce, S-Nonce, and other data, such as the PMK. For example, PTK=SHA1(PMK, client MAC, wireless access point MAC, A-Nonce, S-Nonce).

An embodiment of the invention divides the PTK into four separate keys, each of which is used for different purposes: EAPOL-MIC key, EAPOL-Encr key, Data-MIC key and Data-Encr key (for AES, the Data-MIC key and the Data_Encr key are the same).

In an embodiment of step 115, the client then sends a second message to the wireless access point. The second message includes the client-generated S-Nonce and a MIC, which is a cryptographic checksum of the message. In an embodiment, the MIC is calculated by applying the EAPOL-MIC key, which is part of the PTK, to the other contents of the second message, including the S-Nonce.

In prior systems, every client used the same preshared key. However, embodiments of the invention use multiple preshared keys. For example, each client may be assigned its own exclusive preshared key. In another embodiments, clients may be assigned to groups, with each group having a different exclusive preshared key. Thus, a wireless access point or other network device may store multiple valid keys, such as PSKs, PMKs, or other data derived from the preshared keys, with each key associated with a different client or group of clients. The set of valid keys are stored in a list, array, or other data structure. Because of this, upon receiving the second message from the client, the wireless access point or any other network device must identify which preshared key the client is using.

In an embodiment, method 100 identifies the preshared key used by the client to send the second message. Step 120 begins this identification by selecting one of the keys from the set of valid keys. In an embodiment of step 120, a wireless access point or other network device stores a list of all of the preshared keys assigned to clients, or alternatively, a list of PMKs derived from all of the preshared keys assigned to clients. Upon receiving the second message from a client that includes a S-Nonce and MIC, an embodiment of a wireless access point or other network device will select one of the preshared keys or PMKs from its stored list. The selected key, whether in the form of a PSK, PMK, or other type of derived data, is referred to as a candidate key.

In step 125, the wireless access point or other network device derives a corresponding PTK using the same technique used by the client. The wireless access point or other network device then uses all or a portion of the derived PTK to calculate its own MIC, referred to herein as a verification MIC, based on the contents of the received second message.

In decision block 130, the wireless access point or other network device compares the verification MIC with the MIC included in the second message by the client. If the verification MIC matches the MIC included by the client in the second message, then the wireless access point or other network device has successfully identified the preshared key and corresponding PMK and PTK used by the client. An embodiment of method 100 may then proceed to step 135 to complete the authentication process. The wireless access point or other network device can then communicate with the client using the PTK derived from the selected preshared key or PMK.

Conversely, if the verification MIC does not match the MIC provided by the client in the second message, then method 100 returns to step 120 and the wireless access point or other network device selects another preshared key or PMK from its list, derives a new corresponding PTK and verification MIC in step 125, and compares the new verification MIC with the MIC included in the second message in decision block 130. The steps 120, 125, and 130 may be repeated until the verification MIC matches the MIC provided in the second message. If the wireless access point or other network device does not match a verification MIC with the MIC included in the second message, then the client is not authorized to access the network.

In a further embodiment, network devices such as wireless access points precalculate and store PMKs corresponding with PSKs, so as to reduce the time required to determine and compare a large number of verification MICs with the MIC of the received message from the client.

Following the determination of the correct PTK by the wireless access point or other network device, the authentication process may be completed in step 135 by exchanging one or more additional messages with the client. For example, the wireless access point and client may follow the IEEE 802.11i standard. In this example, the wireless access point provides a group temporal key (GTK) to be used for multicast traffic and a sequence number to the client in a third message. The client then sends a fourth message to the wireless access point or other network device to acknowledge completion of the authentication. Following this, the wireless access point or other network device and the client communicate with each other using the PTK and GTK.

In some networks, it is desirable to be able to change users for access. In an embodiment, the exclusive preshared key scheme described above is combined with an authentication and accounting server, such as a RADIUS server, to perform authentication/accounting/authorization process for large companies. PAP, CHAP, MSCHAPv2, EAP, EAP-LEAP, EAP-PEAP or others can be used as the authentication methods carried by RADIUS protocol for RADIUS servers to authenticate the clients.

To configure exclusive preshared key techniques to work with a RADIUS server, the username and password should be provided. For example, each client is provided with a username, password and PSK. To configure exclusive preshared key techniques to work without a RADIUS server, a username and preshared key is sufficient to distinguish different users.

In a further embodiment using a RADIUS server, each client is provided with a username and password. In this embodiment, a RADIUS server derives a preshared key for each client from the username and password and other data. For example:
<PSK>=<password>, or
<PSK>=<username><concatenating string><password>.
For example, when username="adam" and password="abc123" are provided, and if the expression <PSK>=<password> is chosen, the PSK will be "abc123"; if the expression <PSK>=<username><concatenating string><password> is chosen and the <concatenating string>="#", the PSK will be "adam#abc123".

In client side, the preshared key is given by an administrator to configure a client. The administrator also distributes the preshared key to the wireless access point, RADIUS server, or other network device, such as a wireless access point manager device or application. In RADIUS server, the username and password are configured by the IT administrator.

In further embodiments, passwords may be generated automatically for users. For example:
<password>=SHA1(<username>, <created-time>, <expired-time>, [<index>,] <secret>, <location>, [<SSID>])

In this example, the username is configured for an individual user. The "created-time" is the time when the password is created and start to be used. The "expired-time" is the time when the password ceases to be valid. The "index" is the index of the password which is used to specify one user and to distinguish different users (different users will be given different indexes). The indexes are also used to generate a large numbers of passwords (to derive a bunch of PSKs) for guest clients. The "secret" is a shared secret among all wireless access points for generating the same password for the same user. The "location" is used to distinguish the HQ and branches for large companies. The "SSID" is the SSID the PSKs will apply to. Some or all of these parameters of this example may be optional, for example allowing the SSID and/or index to be omitted.

Embodiments of the invention may allow administrators to configure the username, created-time, expired-time, index, shared secret and location for each user. After the passwords are generated, the PSKs can be derived by using <PSK>=<password> or <PSK>=<username>#<password>. When the index is used, there will be another method to derive the PSK: <PSK>=<username><index>#<password>.

In further embodiments, the clients can be divided into different groups. Each group may be associated with one or more group attributes, such as a VLAN ID, user profile ID(user role) and firewall policy. When the client is being authenticated, the PSK, username and group can be identified. The group attributes can be applied to that client and its connection with the network. This allows different clients or groups of clients to be treated differently upon connection with the network, for example using different VLANs, different user profiles and/or different firewall policies.

In further embodiments, a preshared key may be exclusive to a user or alternatively to a specific client device. In the former case, a user may use their assigned exclusive preshared key for more than one simultaneous network connection. For example, if the user has two laptop computers, he/she can configure these two client devices and connect the two devices to the same wireless network. An exclusive preshared key may be associated with a connection limit to prevent a user from using the same preshared key for an unlimited number of simultaneous network connections. In the case of the latter, a preshared key may be associated with one or more specific client devices, for example using one or more MAC addresses or other unique client device identifiers. This prevents a preshared key from being used with any arbitrary client device.

Embodiments of the invention can employ exclusive preshared key techniques to a variety of applications. The following scenarios illustrate example applications for enabling guest access to a network and employee access to a network in small and large network deployments.

Figure 2:
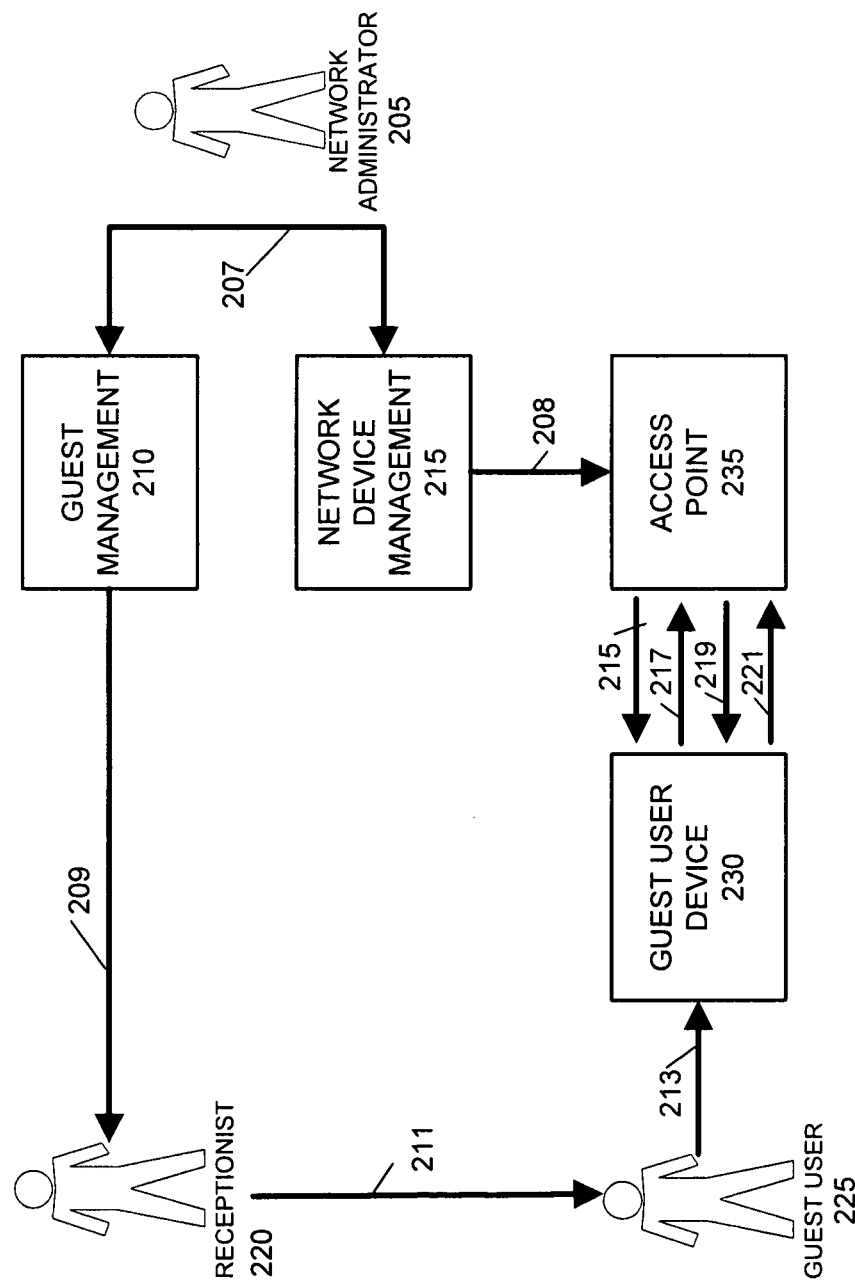
FIG. 2 illustrates a method of authenticating guest users and exchanging cryptographic keys according to an embodiment of the invention.

FIG. 2 illustrates an example 200 of authenticating guest users and exchanging cryptographic keys according to an embodiment of the invention. Example 200 illustrates an application of an embodiment of the invention allowing for free guest access to a network.

In example 200, a network administrator 205 will create a set (for example, 1024) of username/password pairs, derives PSKs from these pairs, and save the PSKs. In an embodiment, the pregenerated preshared keys are saved 207 in a preshared key database associated with a guest manager application 210. The guest manager application 210 then distributes 208 these PSKs, or derived PMKs, to one or more wireless access points, including wireless access point 235 or other network devices to prepare them to receive connections from clients. The pregenerated preshared keys may be distributed using a network device management application 215. Network device management application 215 may include management applications that operate outside of the data path of wireless access points as well as controller applications and devices that are inside of the data path of wireless access points and thus are required by the wireless access points' operation. Usernames, passwords, and/or preshared keys may be generated manually or automatically, for example as described above. In alternate implementations, wireless access points may derive PSKs from username/password pairs, and then derive PMKs from PSKs.

A receptionist 220 or other employee associated with the network accesses the Guest Manager application 209, for example via a graphical user interface, to provide 211 an unused PSK to a guest user 225. In an embodiment, the PSK, expired-time and other info can be printed out and handed to the guest user by the receptionist.

Then the guest user 225 can configure the PSK to his/her own wireless-enabled client device 230 (such as a computer or handheld device) to connect to the wireless network. After the guest's client device 230 gets associated with one of the wireless access points 235 of the network using its assigned preshared key, authentication proceeds as described above.

For example, the access point 235 sends a first message 215 including an A-Nonce to the client. The client 230 response with a second message 217 including an S-Nonce and a MIC created using a PMK derived from the preshared key. In response to the second message 217, the wireless access point 235 will traverse list of PSKs or PMKs to match the received MIC with a validation MIC, as described in method 100, thereby identifying the specific key used by the guest. After the client's key is found, the wireless access point 235 and client will continue their authentication and key exchange using messages 219 and 221.

Figure 3:
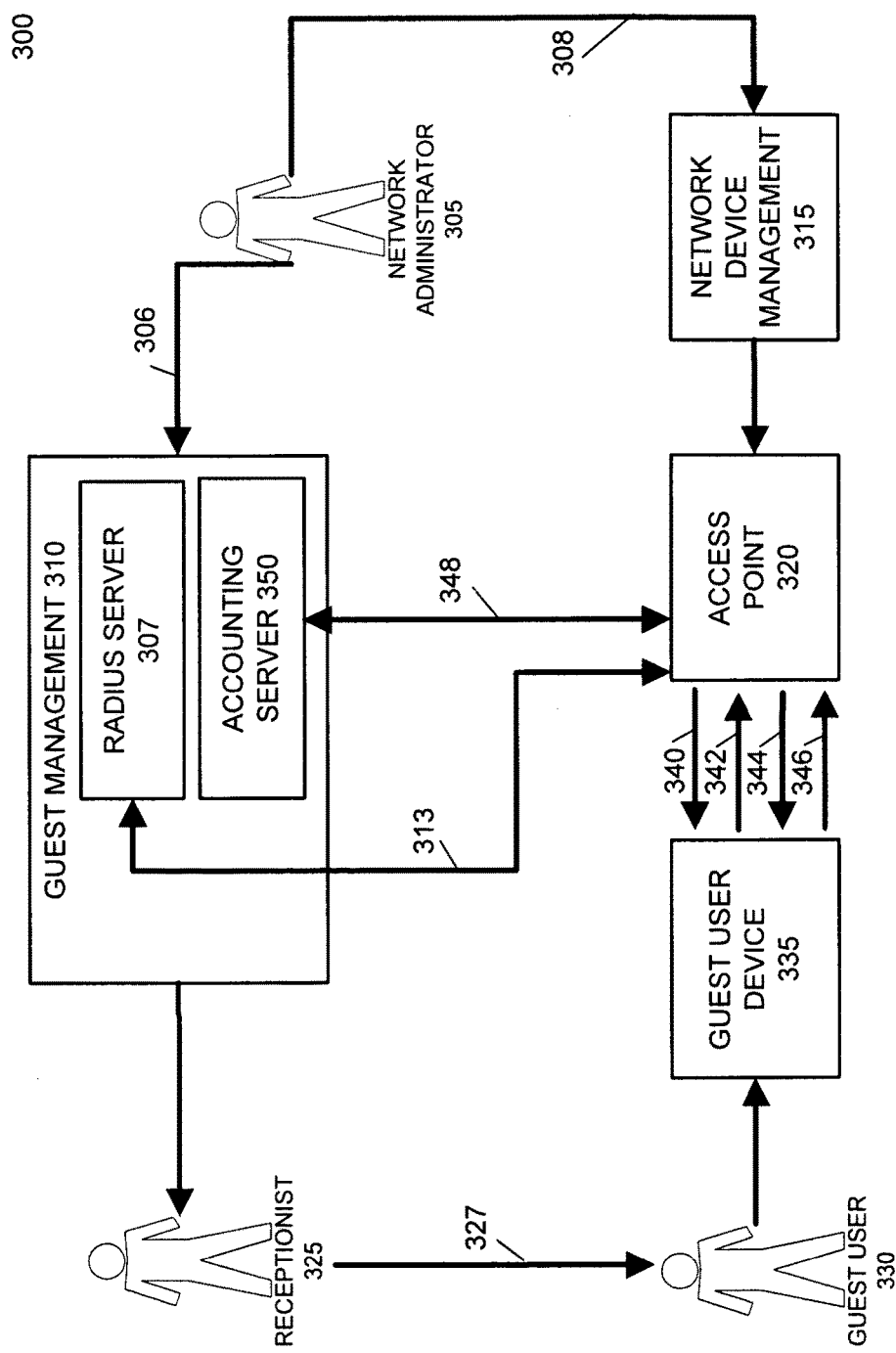
FIG. 3 illustrates another method of authenticating guest users and exchanging cryptographic keys according to an embodiment of the invention.

FIG. 3 illustrates another example 300 of authenticating guest users and exchanging cryptographic keys according to an embodiment of the invention. Example 300 illustrates an application of an embodiment of the invention allowing for paid guest access to a network.

First, an administrator 305 will create a number (for example, 1024) of user accounts including username/password pairs, and send 306 them into the embedded RADIUS server 307 of the guest manager application 310, which derives PSKs from these pairs and saves the PSKs in the PSK database of the guest manager application 310. If the passwords are manually configured, the IT administrator 305 will also distribute 308 these passwords to wireless access points and other network devices, including wireless access point 320 either manually or automatically using a network device management application 315. Passwords may be automatically generated as described above.

A receptionist or other employee 325 associated with the network accesses the Guest Manager application 310, for example via a graphical user interface, to provide 327 an unused PSK to a guest user 330. In an embodiment, the PSK, expired-time and other info can be printed out and handed to the guest user 330 by the receptionist 325. Then the guest user 330 can configure the PSK to his/her own wireless-enabled client device 335 (such as a computer or handheld device) to connect to the wireless network.

After the guest's client device 335 gets associated with one of the wireless access points 320 of the network using its assigned preshared key, authentication proceeds similarly to that described above. For example, the access point 320 sends a first message 340 including an A-Nonce to the client 335.

The client 335 response with a second message 342 including an S-Nonce and a MIC created using a PMK derived from the preshared key. In response to the second message 342, the wireless access point 320 or other network device will traverse list of PSKs or PMKs to match the received MIC with a validation MIC, thereby identifying the specific key used by the guest.

After the client's key is found, the wireless access point 320 will provide the username and password corresponding to the identified PSK or PMK to the RADIUS server 307 to do RADIUS authentication using PAP, CHAP, MSCHAPv2, EAP, or any other authentication technique. In an embodiment, the RADIUS server 307 may be embedded in a guest manager application 310.

If the RADIUS authentication succeeds, the wireless access point 320 will continue the 4-way handshake by sending the third message 344 to the client device 335. The client device 335 will reply fourth message 346 to complete the 4-way handshake.

The wireless access point 320 will send accounting start message 348 to an accounting server 350, which is optionally embedded in the guest manager application 310, to count the time or bandwidth used by the guest user 330. After the customer exhausts their time or bandwidth, the client device 335 of the guest user 330 will be disassociated from the wireless access point 320.

Figure 4:
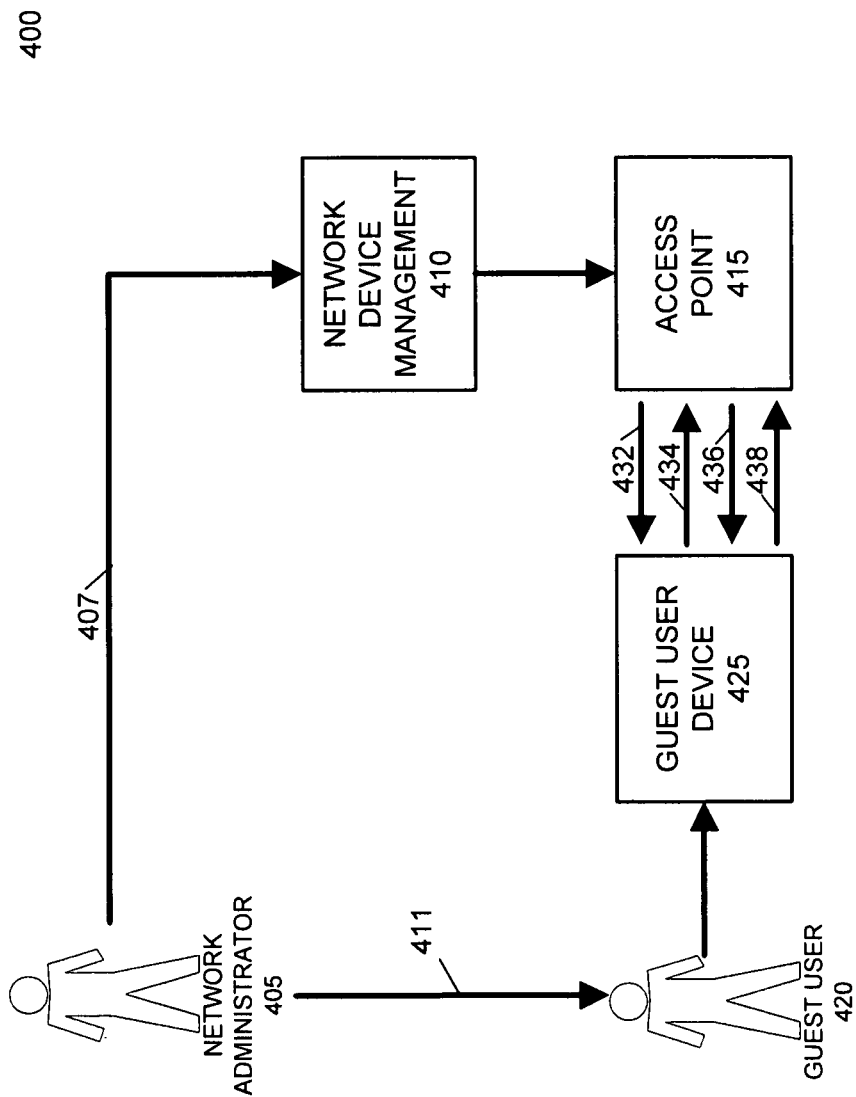
FIG. 4 illustrates a method of authenticating users without an authentication server according to an embodiment of the invention.

FIG. 4 illustrates an example 400 of authenticating users without an authentication server according to an embodiment of the invention. In an embodiment, employee access without an authentication server, such as a RADIUS server, is performed in a similar manner as that done for free guest access, described above. For example, first, an administrator 405 will configure a number (for example, 1024) of user accounts including username/password pairs. The username/password pairs are distributed 407 to wireless access points and other network devices, including wireless access point 415, for example using a management application 410. The wireless access points will derive PSKs from username/password pairs and derive PMKs from PSKs, preparing themselves for user access.

The administrator 405 will derive identical PSKs from username/password pairs and distribute 411 them to employees or other users, including guest user 420. The employees or administrators configure each client device, including guest user device 425 with its assigned PSK.

When the client device 425 starts to associate with one of the wireless access points 415, the wireless access point 415 will send the first message 432 of the 4-way handshake to the client 425. The client device 425 replies the second message 434 including the S-Nonce and MIC. The wireless access point 415 will traverse the PSK list (or PMK list) to find a verification MIC matching the MIC provided by the second message 434, thereby identifying the PSK used by the employee.

After the PSK is found, the wireless access point 415 will send the third message 436 to client device 425. The client device 425 replies with the fourth message 438 to complete the 4-way handshake.

Figure 5:
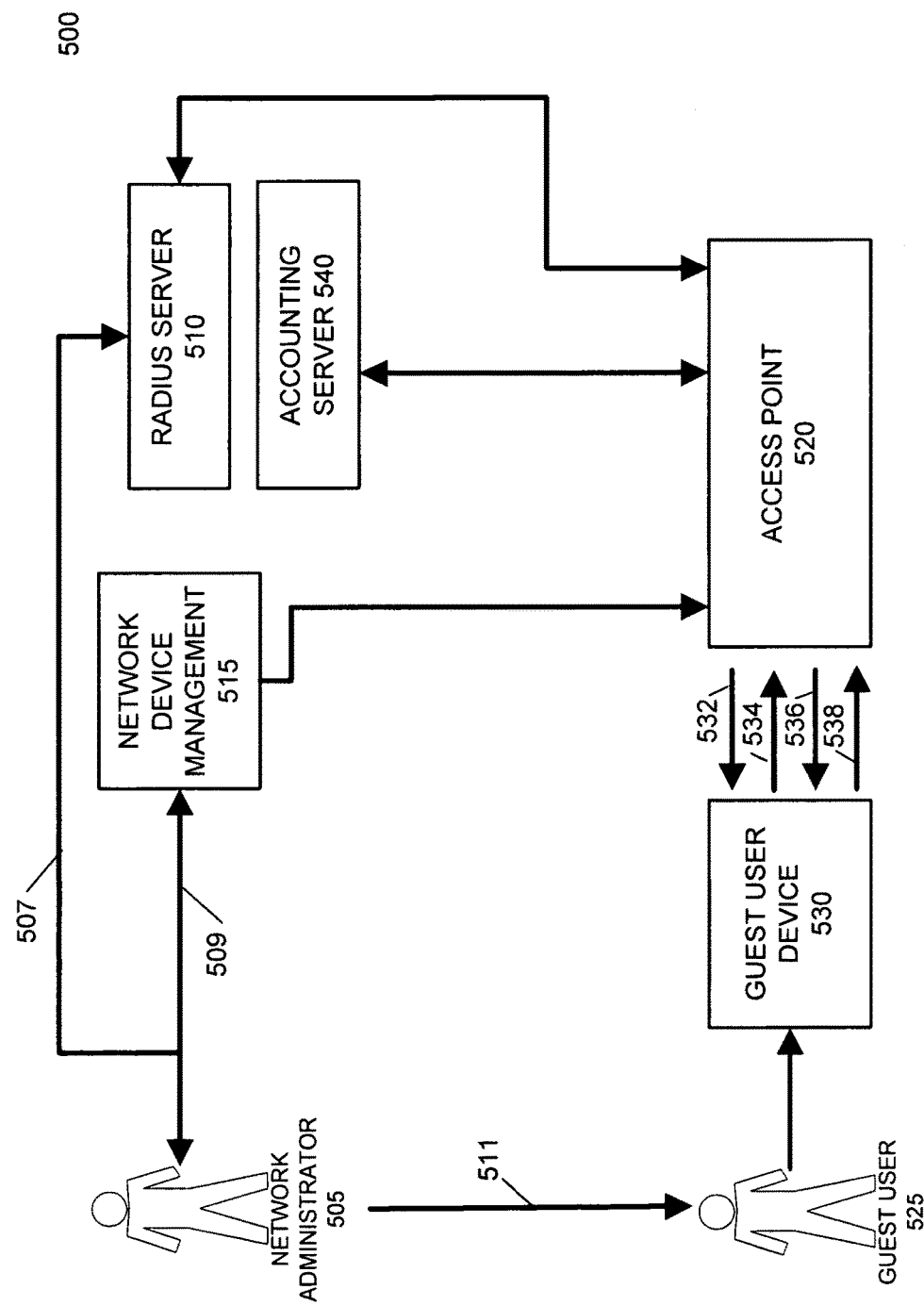
FIG. 5 illustrates a method of authenticating users with an authentication server according to an embodiment of the invention.

FIG. 5 illustrates an example 500 of authenticating users with an authentication server according to an embodiment of the invention. In an embodiment, employee access with an authentication server, such as a RADIUS server, is performed in a similar manner as that done for paid guest access, described above.

For example, first, an administrator 505 will create a number (for example, 1024) of user accounts including username/password pairs, send them into the authentication server 510, such as an embedded RADIUS server of a manager application, and derive PSKs from these pairs and save 509 the PSKs in the PSK database of the manager application 515. The administrator 505 will also distribute these usernames and optionally passwords to wireless access points and other network devices, including wireless access point 520, either manually or automatically using a network device management application 515. Passwords may be automatically generated as described above. The administrator 505 derives PSKs from username/password pairs using the management application 515 and dispatches 511 the PSKs to employees, including guest user 525.

The employees or administrators configure each client device, including guest user device 530 with its assigned PSK. When the client device 530 starts to associate with one of the wireless access points 520, the wireless access point 520 will send the first message 532 of the 4-way handshake to the client 530. The first message 532 includes an A-Nonce.

The client responds with a second message 534 including an S-Nonce and a MIC created using a PMK derived from the preshared key. In response to the second message 534, the wireless access point 520 will traverse the stored PSKs or PMKs to match the received MIC with a validation MIC, thereby identifying the specific key used by the guest user device 530.

After the client's key is found, the wireless access point 520 will provide the username and password corresponding to the identified PSK or PMK to the authentication server, such as a RADIUS server 510, to authenticate the user via PAP, CHAP, MSCHAPv2, EAP, or any other authentication technique. In an embodiment, the authentication server may be embedded in a network device manager application 515.

If the RADIUS authentication succeeds, the wireless access point 520 will continue the 4-way handshake by sending the third message 536 to the client device 530, for example including a GTK. The client device 530 will reply with a fourth message 538 to complete the 4-way handshake. Upon establishing a connection between the guest user device 530 and the wireless access point 520, the wireless access point 520 may notify the accounting server 540 to allow tracking and possible billing for network usage.

In a further embodiment, PSKs may be assigned creation times and expiration times. In an embodiment, these assigned times are stored by wireless access points in addition to their respective PSKs or PMKs. Upon receiving a second message from a client during the 4-way authentication and identifying the PSK or PMK used by the client, an embodiment of the invention compares the current time with the creation and expiration times associated with the PSK or PMK. If the current time is between the creation and expiration times, then authentication proceeds; otherwise the authorization fails and the client is disassociated from the wireless access point.

In an embodiment, multiple keys, such as PSKs, can be assigned to each user or client, to allow for seamless key changes when keys expire.

In an embodiment, a management application 515 can also revoke keys from clients. In this embodiment, a management application 515 directs wireless access points and other network devices to remove or mark invalid one or more specified keys. Once removed or marked invalid, a revoked key cannot be used by a client to access the network.

As described above, a wireless access point 520 generates and compares at least one and typically more validation MICs with a client supplied MIC to identify the client's assigned PSK. In a further embodiment, upon successfully identifying a client's assigned PSK, a wireless access point or other network device forwards the client's MAC address or other identifier, such as a user name, to a roaming cache data structure accessible to other wireless access points or other devices. A roaming cache is a data structure stored in a memory that associates client identifiers, such as client MAC addresses or user names, with PSKs or PMKs. If the client later roams and attempts to connect to another wireless access point, the roaming cache is checked against the client's MAC address. If there is matching entry, the associated PSK or PMK is used finish the authentication of the roaming client. Additionally, any RADIUS or other authentication may be skipped if the client matches the roaming cache. If there are no matching roaming cache entries, then the wireless access point or other network device traverses its key list to calculate validation MICs to identify the client's PSK or PMK.

In still a further embodiment, a wireless access point or other network device can use a roaming cache to store previously connected clients' MAC addresses or other identifiers and their associations with PSKs or PMKs. In this embodiment, if a previously-connected client reconnects with the same wireless access point or other network device, or any other network device having access to the same roaming cache data, the network device may identify this client's PSK or PMK using the roaming cache, rather than traversing the list of all PSKs or PMKs to compare validation MICs. This decreases the time and computational costs when clients frequently reconnect with the same wireless access point or other network device.

Figure 6:
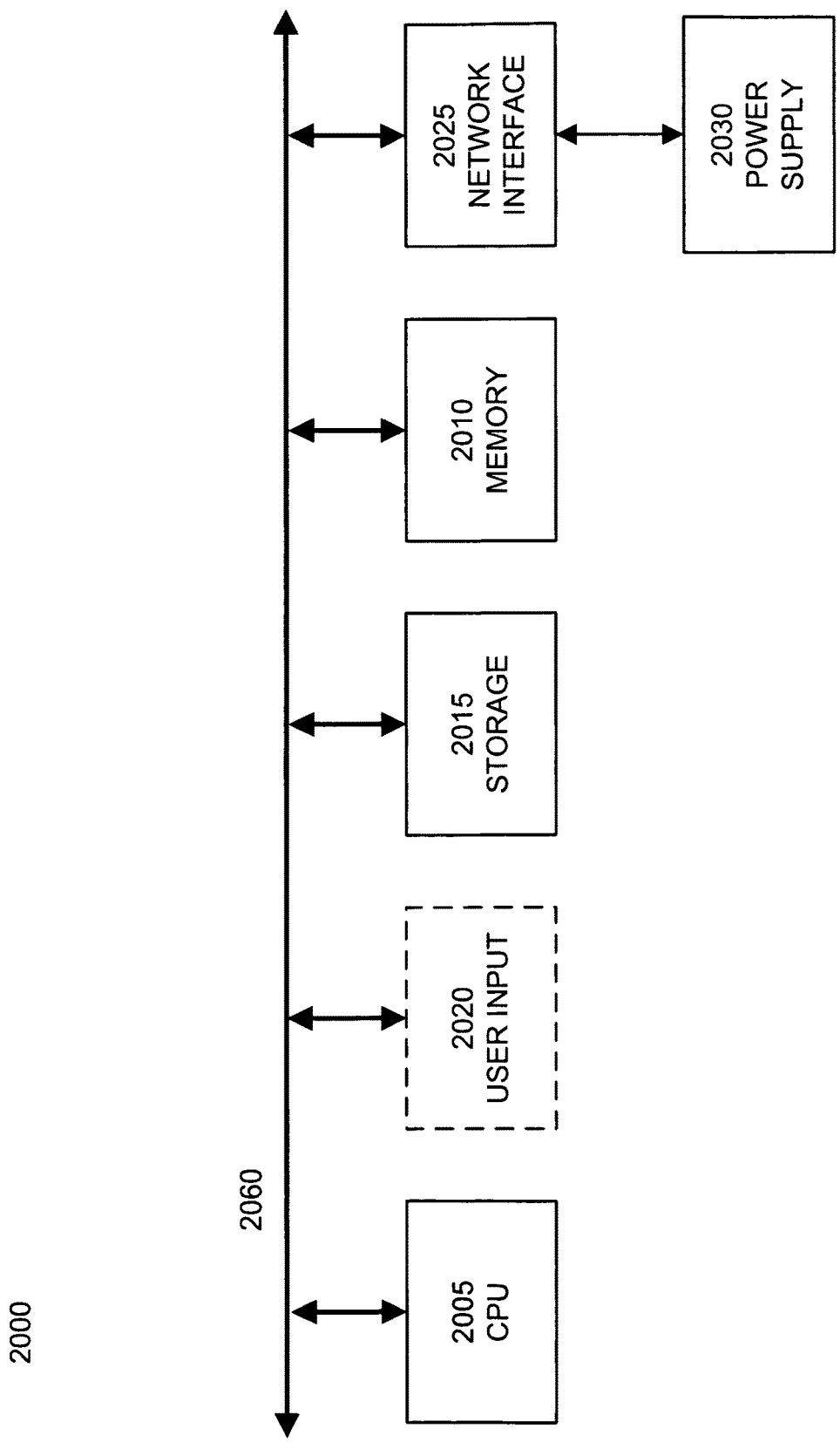
FIG. 6 illustrates a computer system suitable for implementing an embodiment of the invention.

FIG. 6 illustrates a computer system suitable for implementing an embodiment of the invention. FIG. 6 is a block diagram of a computer system 2000, such as a personal computer or other digital device, suitable for practicing an embodiment of the invention. Embodiments of computer system 2000 include dedicated networking devices, such as wireless access points, network switches, hubs, routers, hardware firewalls, network traffic optimizers and accelerators, network attached storage devices, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices. Memory 2010 may store a firmware image comprising applications and data adapted to be executed by computer system 2000.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include a wired networking interface, such as one or more Ethernet connections to communicate with other networking devices via local or wide-area networks. In a further embodiment, computer system 2000 may be capable of receiving some or all of its required electrical power via the network interface 2025, for example using a wired networking interface power over Ethernet system.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

A power supply 2030 provides electrical power to the computer system 2000. Power supply 2030 may be adapted to draw electrical power from a connection with an electrical power distribution grid. In an embodiment, power supply 2030 is connected with network interface 2025 to draw electrical power for computer system 2000 from one or more wired network connections using a network power standard, such as IEEE 802.3af.

Although embodiments of the invention are discussed with reference to the IEEE 802.11i standard, embodiments of the invention are equally applicable to other standard and proprietary network authentication standards. Additionally, embodiments of the invention are not limited to 802.1x wireless network connections and may be utilized for any type of communication network where user authentication and/or network security is required.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable medium including instructions adapted to direct a computer to perform an operation, the operation comprising:
    receiving at an access point (AP) a parameter including a secret shared by the AP and a server, and derived by the server from user credentials;
    generating at the AP a set of cryptographic keys such that at least one cryptographic key in the set is generated as a function of the secret, the set of cryptographic keys comprises preshared keys including a preshared key provided to a client device, the preshared key uniquely associated with a specific plurality of client devices including the client device by being uniquely associated with client device identifiers of the specific plurality of client devices to prevent the preshared key from being used with arbitrary client devices;
    initiating at the AP a secure network connection with the client device, wherein the client device includes a network configuration based on a client cryptographic key;
    receiving at the AP a first message from the client device, wherein the first message includes a client cryptographic checksum based on at least the client cryptographic key and data included in the first message;
    selecting at the AP a candidate cryptographic key from the set of cryptographic keys;
    determining a validation cryptographic checksum based on at least the candidate cryptographic key and data included in the first message received from the client device;
    determining if the candidate cryptographic key matches the client cryptographic key by comparing the validation cryptographic checksum with the client cryptographic checksum and indicating that the candidate cryptographic key matches the client cryptographic key if the validation cryptographic checksum matches the client cryptographic checksum;
    in response to the determination that the candidate cryptographic key matches the client cryptographic key, establishing the secure network connection with the client device using the selected candidate cryptographic key; and
    in response to the determination that the candidate cryptographic key matches the client cryptographic key, associating a client device identifier with the candidate cryptographic key in a roaming cache that is accessible to the AP and at least one other access point not connected with the client device.

2. The non-transitory computer-readable medium of claim 1, wherein the client device identifier includes a MAC address.

3. The non-transitory computer-readable medium of claim 1, wherein the client device identifier includes a user name.

4. The non-transitory computer-readable medium of claim 1, wherein selecting the candidate cryptographic key from the set of cryptographic keys comprises:
    determining a client identifier associated with the client device;
    searching the roaming cache for the client identifier;
    in response to the roaming cache including the client identifier, selecting a cryptographic key associated by the roaming cache with the client identifier as the candidate cryptographic key; and in response to the roaming cache not including the client identifier, selecting the candidate cryptographic key from a subset of valid cryptographic keys of the set of cryptographic keys.

5. The non-transitory computer-readable medium of claim 1, wherein the candidate cryptographic key is a second cryptographic key, the operation comprising, prior to selecting the second cryptographic key, repeating one or more times:

selecting a first candidate cryptographic key from the set of cryptographic keys;

determining that the first candidate cryptographic key does not match the client cryptographic key.

6. The non-transitory computer-readable medium of claim 1, wherein establishing the secure network connection comprises: sending at least a second message to the client device including a portion encrypted using the selected candidate cryptographic key.

7. The non-transitory computer-readable medium of claim 1, wherein the set of cryptographic keys comprises derived keys determined from the preshared keys and including at least a first derived key determined from the preshared key previously provided to the client device.

8. The non-transitory computer-readable medium of claim 1, wherein the client cryptographic key is associated only with the client device.

9. The non-transitory computer-readable medium of claim 1, wherein the client cryptographic key is associated only with a user of the client device.

10. The non-transitory computer-readable medium of claim 1, wherein the client cryptographic key is associated only with a group of users of client devices including a first user of the client device.

11. The non-transitory computer-readable medium of claim 1, the operation further comprising: receiving at the AP an algorithm for generating the set of cryptographic keys.

12. The non-transitory computer-readable medium of claim 11, wherein the algorithm is received from a network device management application.

13. The non-transitory computer-readable medium of claim 1, wherein establishing the secure network connection with the client device comprises:

providing user credentials associated with the selected candidate cryptographic key to an authentication server;

receiving an authentication response from the authentication server;

in response to the authentication response including an indicator of successful authentication, completing the initiation of the secure network connection with the client device; and in response to the authentication response not including an indicator of successful authentication, rejecting the initiation of the secure network connection with the client device.

14. The non-transitory computer-readable medium of claim 1, the operation further comprising: sending a second message to an accounting server upon completion of the establishment of the secure connection with the client device, wherein the second message is adapted to initiate usage tracking of the secure connection with the client device.

15. The non-transitory computer-readable medium of claim 1, wherein establishing the secure network connection with the client device includes using a handshake protocol of a secure communications standard.

16. The non-transitory computer-readable medium of claim 1, wherein the computer-readable medium includes a firmware image adapted to be stored in a memory of a wireless network interface device.

17. A system comprising:

a means for receiving at an access point (AP) a parameter including a secret shared by the AP and a server, and derived by the server from user credentials;

a means for generating at the AP a set of cryptographic keys such that at least one cryptographic key in the set is generated as a function of the secret, the set of cryptographic keys comprises preshared keys including a preshared key provided to a client device, the preshared key uniquely associated with a specific plurality of client devices including the client device by being uniquely associated with client device identifiers of the specific plurality of client devices to prevent the preshared key from being used with arbitrary client devices;

a means for initiating at the AP a secure network connection with the client device, wherein the client device includes a network configuration based on a client cryptographic key;

a means for receiving at the AP a message from the client device, wherein the message includes a client cryptographic checksum based on at least the client cryptographic key and data included in the message;

a means for selecting at the AP a candidate cryptographic key from the set of cryptographic keys;

a mean for determining a validation cryptographic checksum based on at least the candidate cryptographic key and data included in the message received from the client device;

a means for determining if the candidate cryptographic key matches the client cryptographic key by comparing the validation cryptographic checksum with the client cryptographic checksum and indicating that the candidate cryptographic key matches the client cryptographic key if the validation cryptographic checksum matches the client cryptographic checksum;

a means for, in response to the determination that the candidate cryptographic key matches the client cryptographic key, establishing the secure network connection with the client device using the selected candidate cryptographic key; and a means for, in response to the determination that the candidate cryptographic key matches the client cryptographic key, associating a client device identifier with the candidate cryptographic key in a roaming cache that is accessible to the AP and at least one other access point not connected with the client device.

18. A method comprising:

receiving at an access point (AP) a parameter including a secret shared by the AP and a server, and derived by the server from user credentials;

generating at the AP a set of cryptographic keys such that at least one cryptographic key in the set is generated as a function of the secret, the set of cryptographic keys comprises preshared keys including a preshared key provided to a client device, the preshared key uniquely associated with a specific plurality of client devices including the client device by being uniquely associated with client device identifiers of the specific plurality of client devices to prevent the preshared key from being used with arbitrary client devices;

initiating at the AP a secure network connection with the client device, wherein the client device includes a network configuration based on a client cryptographic key;

receiving at the AP a message from the client device, wherein the message includes a client cryptographic checksum based on at least the client cryptographic key and data included in the message;

selecting at the AP a candidate cryptographic key from the set of cryptographic keys;

determining a validation cryptographic checksum based on at least the candidate cryptographic key and data included in the message received from the client device;

determining if the candidate cryptographic key matches the client cryptographic key by comparing the validation cryptographic checksum with the client cryptographic checksum and indicating that the candidate cryptographic key matches the client cryptographic key if the validation cryptographic checksum matches the client cryptographic checksum;

in response to the determination that the candidate cryptographic key matches the client cryptographic key, establishing the secure network connection with the client device using the selected candidate cryptographic key; and in response to the determination that the candidate cryptographic key matches the client cryptographic key, associating a client device identifier with the candidate cryptographic key in a roaming cache that is accessible to the AP and at least one other access point not connected with the client device.

19. A non-transitory computer-readable medium including instructions adapted to direct a computer to perform an operation, the operation comprising:

receiving at an access point (AP) a secret shared by the AP and a RADIUS server and derived by the RADIUS server from user credentials;

generating at the AP a set of cryptographic keys as a function of the secret, the set of cryptographic keys comprises preshared keys including a preshared key provided to a client device, the preshared key uniquely associated with a specific plurality of client devices including the client device by being uniquely associated with client device identifiers of the specific plurality of client devices to prevent the preshared key from being used with arbitrary client devices;

initiating at the AP a secure network connection with the client device, wherein the client device includes a network configuration based on a client cryptographic key;

receiving at the AP a message from the client device, wherein the message includes a client cryptographic checksum based on at least the client cryptographic key and on data included in the message;

selecting at the AP a candidate cryptographic key from the set of cryptographic keys;

determining a validation cryptographic checksum based on at least the candidate cryptographic key and data included in the message received from the client device;

determining if the candidate cryptographic key matches the client cryptographic key by comparing the validation cryptographic checksum with the client cryptographic checksum and indicating that the candidate cryptographic key matches the client cryptographic key if the validation cryptographic checksum matches the client cryptographic checksum;

in response to the determination that the candidate cryptographic key matches the client cryptographic key, establishing the secure network connection with the client device using the selected candidate cryptographic key; and in response to the determination that the candidate cryptographic key matches the client cryptographic key, associating a client device identifier with the candidate cryptographic key in a roaming cache that is accessible to the AP and at least one other access point not connected with the client device.

20. A non-transitory computer-readable medium including instructions adapted to direct a computer to perform an operation, the operation comprising:

receiving at an access point (AP) a secret shared by the AP and a RADIUS server and derived by the RADIUS server from user credentials;

generating at the AP a set of cryptographic keys as a function of the secret, the set of cryptographic keys comprises preshared keys including a preshared key provided to a client device, the preshared key uniquely associated with a specific plurality of client devices including the client device by being uniquely associated with client device identifiers of the specific plurality of client devices to prevent the preshared key from being used with arbitrary client devices;

initiating at the AP a secure network connection with the client device, wherein the client device includes a network configuration based on a client cryptographic key;

receiving at the AP a message from the client device, wherein the message includes a client cryptographic checksum based on at least the client cryptographic key and on data included in the message;

selecting at the AP a first candidate cryptographic key from the set of cryptographic keys;

determining a first validation cryptographic checksum based on at least the first candidate cryptographic key and data included in the message received from the client device;

determining if the first candidate cryptographic key matches the client cryptographic key by comparing the first validation cryptographic checksum with the client cryptographic checksum and indicating that the first candidate cryptographic key matches the client cryptographic key if the validation cryptographic checksum matching the client cryptographic checksum; and in response to the determination that the first candidate cryptographic key does not match the client cryptographic key:

selecting at the AP a second candidate cryptographic key from the set of cryptographic keys;

determining a second validation cryptographic checksum based on at least the second candidate cryptographic key and data included in the message received from the client device;

determining if the second candidate cryptographic key matches the client cryptographic key by comparing the second validation cryptographic checksum with the client cryptographic checksum and indicating that the second candidate cryptographic key matches the client cryptographic key if the second validation cryptographic checksum matches the client cryptographic checksum;

in response to the determination that the second candidate cryptographic key matches the client cryptographic key, establishing the secure network connection with the client device using the second candidate cryptographic key;

in response to the determination that the second candidate cryptographic key matches the client cryptographic key, associating a client device identifier with the second candidate cryptographic key in a roaming cache that is accessible to the AP and at least one other access point not connected with the client device.

21. A non-transitory computer-readable medium including instructions adapted to direct a computer to perform an operation, the operation comprising:

receiving at an access point (AP) a secret shared by the AP and a network management server and derived by the network management server from user credentials;

generating at the AP a set of cryptographic keys as a function of the secret, the set of cryptographic keys comprises preshared keys including a preshared key provided to a client device, the preshared key uniquely associated with a specific plurality of client devices including the client device by being uniquely associated with client device identifiers of the specific plurality of client devices to prevent the preshared key from being used with arbitrary client devices;

initiating at the AP a secure network connection with the client device, wherein the client device includes a network configuration based on a client cryptographic key;

receiving at the AP a message from the client device, wherein the message includes a client cryptographic checksum based on at least the client cryptographic key and on data included in the message;

selecting at the AP a first candidate cryptographic key from the set of cryptographic keys;

determining a first validation cryptographic checksum based on at least the first candidate cryptographic key and data included in the message received from the client device;

determining if the first candidate cryptographic key matches the client cryptographic key by comparing the first validation cryptographic checksum with the client cryptographic checksum and indicating that the first candidate cryptographic key matches the client cryptographic key if the validation cryptographic checksum matching the client cryptographic checksum; and in response to the determination that the first candidate cryptographic key does not match the client cryptographic key:

selecting at the AP a second candidate cryptographic key from the set of cryptographic keys;

determining a second validation cryptographic checksum based on at least the second candidate cryptographic key and data included in the message received from the client device;

determining if the second candidate cryptographic key matches the client cryptographic key by comparing the second validation cryptographic checksum with the client cryptographic checksum and indicating that the second candidate cryptographic key matches the client cryptographic key if the second validation cryptographic checksum matches the client cryptographic checksum;

in response to the determination that the second candidate cryptographic key matches the client cryptographic key, establishing the secure network connection with the client device using the second candidate cryptographic key;

in response to the determination that the second candidate cryptographic key matches the client cryptographic key, associating a client device identifier with the second candidate cryptographic key in a roaming cache that is accessible to the AP and at least one other access point not connected with the client device.

* * * * *